Patented June 26, 1945

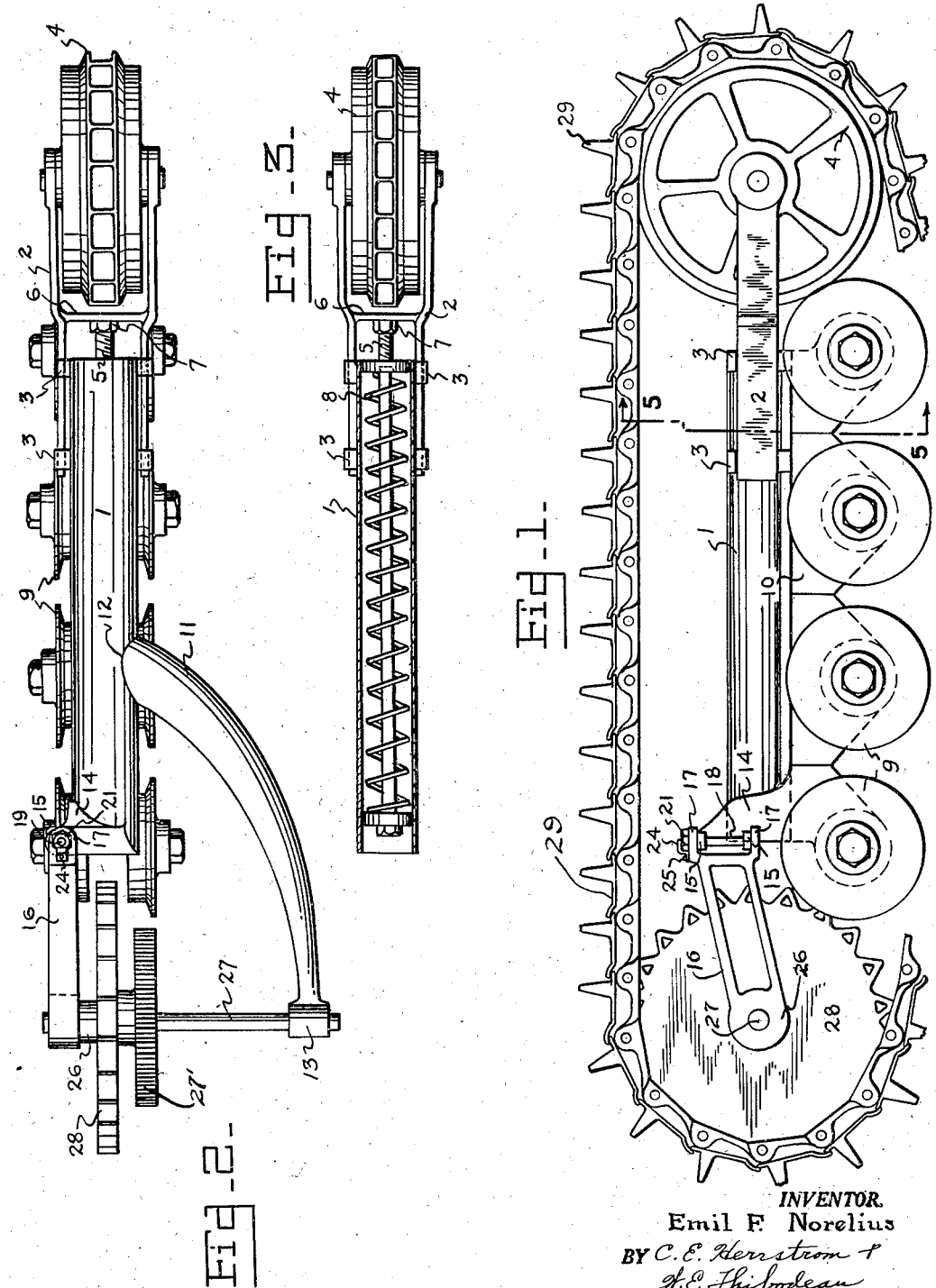

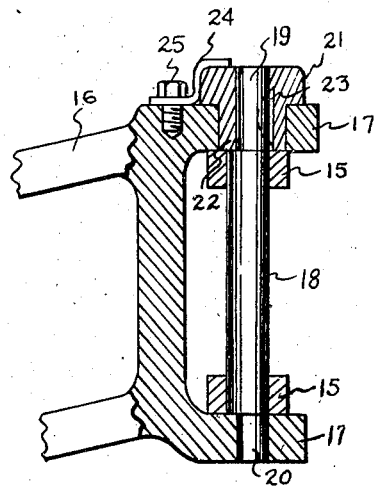
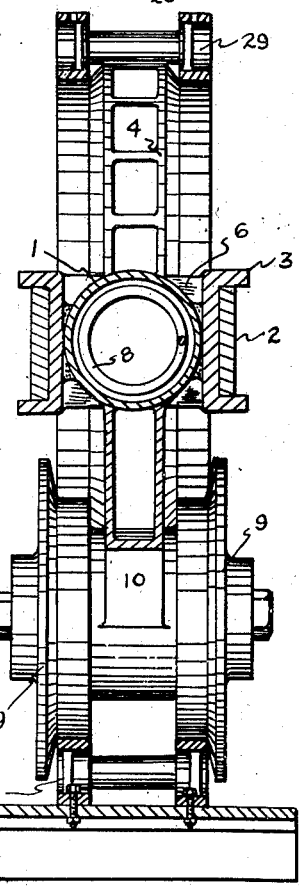

2,378,942

UNITED STATES PATENT OFFICE 2,378,942

TRUCK FRAME

Emil F. Norelius, Springfield, Ill.

Application October 8, 1943, Serial No. 505,444

5 Claims. (Cl. 305—9)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel truck frame for track-laying vehicles, wherein such a frame is disposed at each side of the vehicle, on which are mounted the wheels that run on the track. In some existing constructions one end of the frame is forked and fitted with alined bearings that receive the drive shaft. The drive sprocket for the track is mounted on the shaft and is disposed between the sides of the fork. In such a construction it is comparatively difficult to replace a sprocket because the rigidity of the frame requires extensive dismantling.

One of the objects of the invention is to overcome this difficulty and is accomplished by providing one of the sides of the fork as a member detachable from the main longitudinal member of the frame. The detachable member is a link in the outward side of the frame, while the remaining side of the fork is a supporting arm extending rigidly from the longitudinal frame member in the inward direction or towards the center line of the vehicle. The link and the arm are formed respectively with alined bearings to receive the drive shaft or axle, and the drive sprocket is mounted on the shaft and between the bearings. Consequently, in order to replace the sprocket, it is merely necessary to remove the link rather than dismantle the entire truck frame.

The connection between the link and the longitudinal member of the frame is preferably a vertical pin having mutually eccentric parts received respectively in the longitudinal member and the link. Adjustment of the pin about its axis effects an adjustment in the alinement of the truck frames with each other and with the body of the vehicle. This is another advantage over the completely rigid construction.

Another advantage resides in the fact that the link is free to swing about the vertical axis of the pin, thereby relieving transverse or horizontal stresses such as are set up in the outer forked portion of a frame of rigid construction.

An illustrative embodiment of the invention is disclosed in the following description and in the accompanying drawings in which:

Figure 1 is a side elevation of a truck frame, according to the invention, with a track mounted thereon;

Figure 2 is a plan view;

Figure 3 is a plan section;

Figure 4 is a vertical section of the connecting pin and its mounting, and

Figure 5 is a section on the line 5—5 of Figure 1.

Reference to the drawings will now be made by use of like numerals to designate corresponding parts throughout.

Each side of the vehicle is provided with a truck frame carrying wheels around which is mounted an endless track in a manner well known in the art. Each truck includes a longitudinal member 1 which may be hollow or tubular and at the forward end of which is mounted a fork 2 held in guides 3. The fork carries an idler wheel 4 disposed forward of the member 1. An adjustment bolt 5 is secured in a bridge 6 of the fork 2 by means of a nut 7. The bolt enters the forward end of the tubular member 1 and is engaged by a tension spring 8 housed within the member 1. A series of bogie wheels 9 is supported by the member 1 in any suitable manner as, for example, by a common bearing 10.

A supporting or stabilizing arm 11 extends from the member 1 towards the center line of the vehicle and is fastened to the member 1, preferably near the rear end thereof, by any suitable means such as welding 12. The arm terminates in a bearing 13 disposed near the center line of the vehicle and is positioned to receive the drive shaft or axle, or an extension thereof, as will presently appear. A similar structure is obviously provided at the other side of center line, and the bearings 13 lie on the opposite sides of the center line and in close proximity thereto.

The rear end of the member 1 carries a bracket 14 formed with a pair of vertically alined ears 15, as shown more clearly in Figure 4. The bracket supports a stabilizer link 16 having a pair of ears 17 disposed adjacent to the ears 15. The connection is made by means of an eccentric pin having a cylindrical body 18 received in one of the pairs of ears and a pair of offset but mutually alined end portions 19 and 20 received in the other pair of ears. In the example shown, the body portion is received in the ears 15 and the ends 19 and 20 in the ears 17, but this condition would be reversed if the ears 17 were disposed between the ears 15. On the end 19 is mounted a polygonal head 21 with a bushing 22 extending into the adjacent ear 17 and fastened to the end by a suitable key 23. By turning the head 21 an adjustment is made in the center distance of the ears 15 from the ears 17. The adjustment is secured by a locking clip 24 fastened at 25 to the link 16 and fitted on a side of the head 21.

The free end of the link 16 is formed with a self-alining bearing 26 alined with the bearing 13. These bearings receive an axle 27 on which is mounted a gear 27' driven from the motor through a transmission in any manner known in the art. In each truck frame the axle carries a drive sprocket 28 disposed near the bearing 26 and in line with the bogie wheels 9 and the idler 4. An endless track 29 of appropriate design is trained over the drive sprocket and idler and engaged by the bogie wheels.

By reason of the permanent rigidity of the support arm 11 with the longitudinal member 1, the frame originates basically at substantially the longitudinal center of the axle 27, rather than at the center and outside of the drive sprocket as in previous constructions. A better basic structure is thereby obtained.

Also, the replacement of the drive sprocket and parts associated therewith is considerably simpler than if the link 16 were permanently rigid with respect to the member 1. In making a replacement in this area, it is a comparatively simple operation to remove the pin 18—20 and the link 16. Finally, the alinement of the truck frames with each other and the vehicle may be made when necessary by adjusting the eccentric pin 18—20 in the manner previously described. The pivotal mounting of the link 16 on a vertical axis permits relief of stresses transverse of the vehicle.

The invention is not limited to the precise details of construction herein shown and described, and modifications may be made without departing from the scope of the invention as indicated by the appended claims.

What I claim is:

1. A truck frame for carrying an endless track at a side of a vehicle, comprising a longitudinal frame member, a supporting arm extending laterally inward and rigidly from said frame member, a bearing carried by the free end of said arm, a link detachably connected to said member and disposed outward of said arm, said link and arm extending beyond one end of said frame member, a bearing carried by the free end of said link and co-axial with first named bearing, and means at the other end of said frame for supporting a wheel.

2. A truck frame for carrying an endless track at a side of a vehicle, comprising a longitudinal frame member, a supporting arm extending laterally inward and rigidly from said frame member, a bearing carried by the free end of said arm, a link extending from said member outwardly of said arm, said link and arm extending beyond one end of said frame member, a removable pin connecting said link to said member, and a bearing carried by the free end of said link and co-axial with the first named bearing.

3. A truck frame for carrying an endless track at a side of a vehicle, comprising a longitudinal frame member, a supporting arm extending laterally inward and rigidly from said frame member, a bearing carried by the free end of said arm, a link extending from said member outwardly of said arm, said link and arm extending beyond one end of said frame member, a removable pin connecting said link to said member, the parts of said pin received in said member and link being eccentric to each other, means for securing said pin in selected positions about its axis, and a bearing carried by the free end of said link and co-axial with first named bearing.

4. A truck frame for carrying an endless track at a side of a vehicle, comprising a longitudinal frame member, a supporting arm extending laterally inward and rigidly from said frame member, a bearing carried by the free end of said arm, a link extending from said member outwardly of said arm, said link and arm extending beyond one end of said frame member, a removable pin connecting said link to said member, a bearing carried by the free end of said link and coaxial with the first named bearing, an axle mounted in said bearings, and a sprocket wheel on said axle between said bearings and nearer the bearing in said link.

5. A truck frame for carrying an endless track at a side of a vehicle, comprising a longitudinal frame member, a supporting arm extending laterally inward and rigidly from said frame member, a bearing carried by the free end of said arm, a link extending from said member outwardly of said arm, said link and arm extending beyond one end of said frame member, a removable pin connecting said link to said member, the parts of said pin received in said member and link being eccentric to each other, means for securing said pin in selected positions about its axis, a bearing carried by the free end of said link and co-axial with first named bearing, an axle mounted in said bearings, and a sprocket wheel on said axle between said bearings and nearer the bearing in said link.

EMIL F. NORELIUS.